J. W. BRYCE.
METHOD OF PUNCHING WORKMEN'S CARDS.
APPLICATION FILED AUG. 3, 1915.

1,207,491.

Patented Dec. 5, 1916.
4 SHEETS—SHEET 1.

J. W. BRYCE.
METHOD OF PUNCHING WORKMEN'S CARDS.
APPLICATION FILED AUG. 3, 1915.
1,207,491.
Patented Dec. 5, 1916.
4 SHEETS—SHEET 2.
Fig. 4,
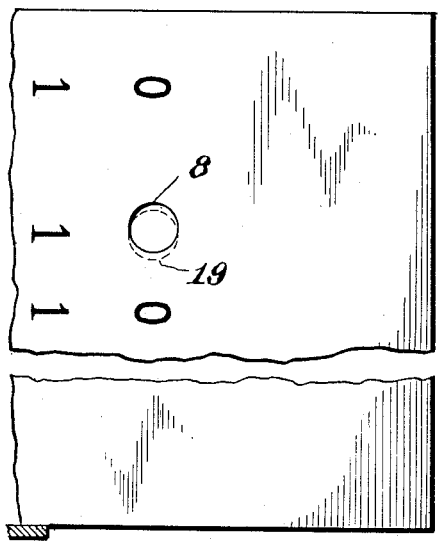
Fig. 5,
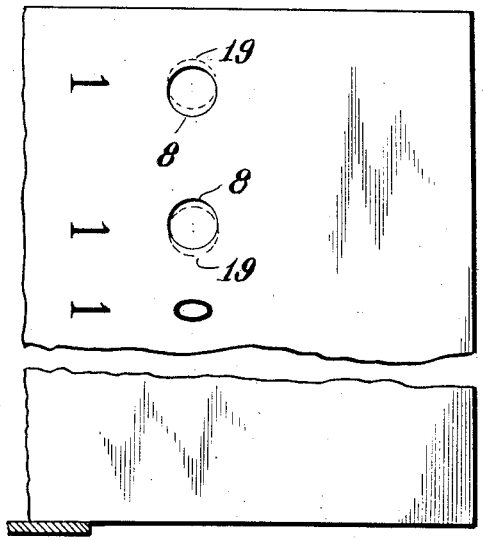
Fig. 6,
Fig. 7,
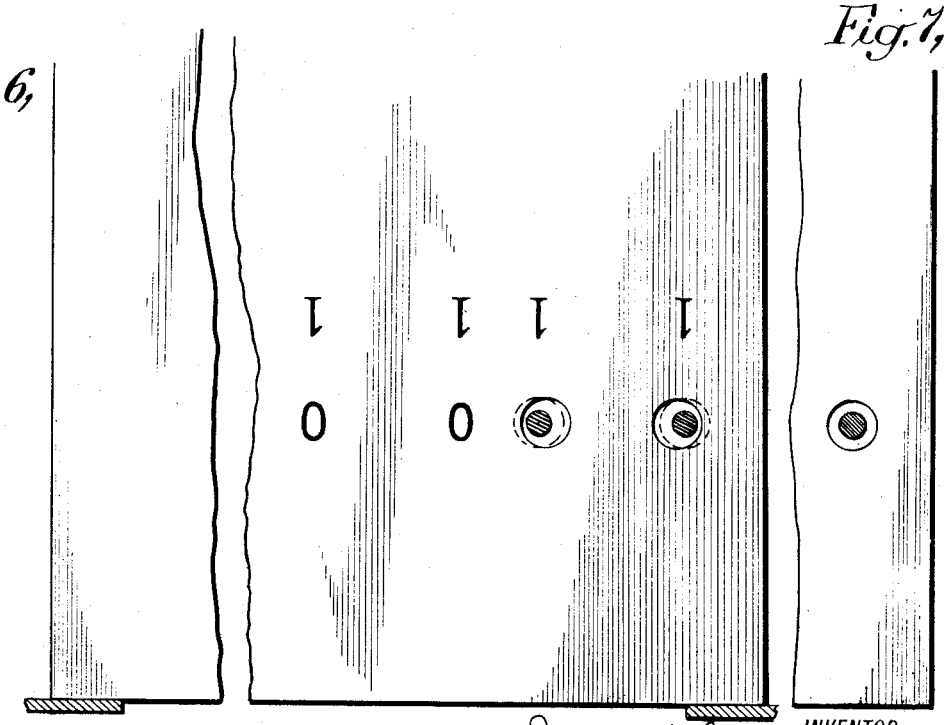
James W. Bryce, INVENTOR
BY Kerr Page Cooper
& Hayward
his ATTORNEYS J. W. BRYCE.
METHOD OF PUNCHING WORKMEN'S CARDS.
APPLICATION FILED AUG. 3, 1915.
1,207,491.
Patented Dec. 5, 1916.
4 SHEETS—SHEET 3.
Fig. 8,
Fig. 10,
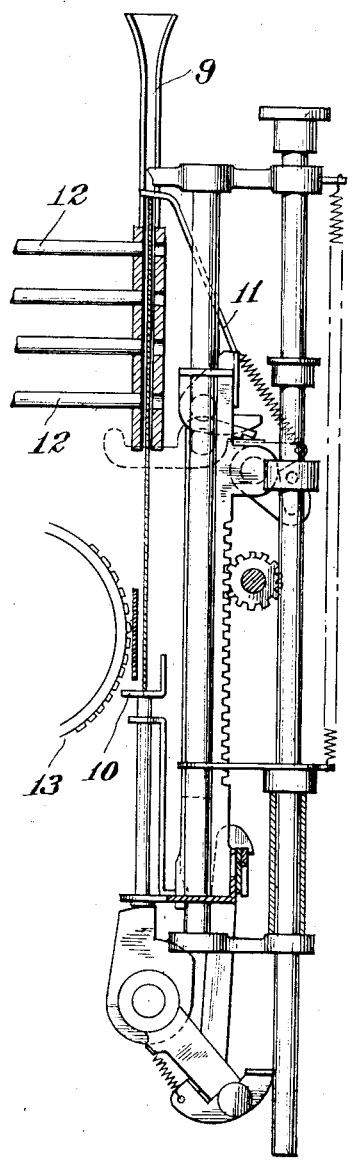
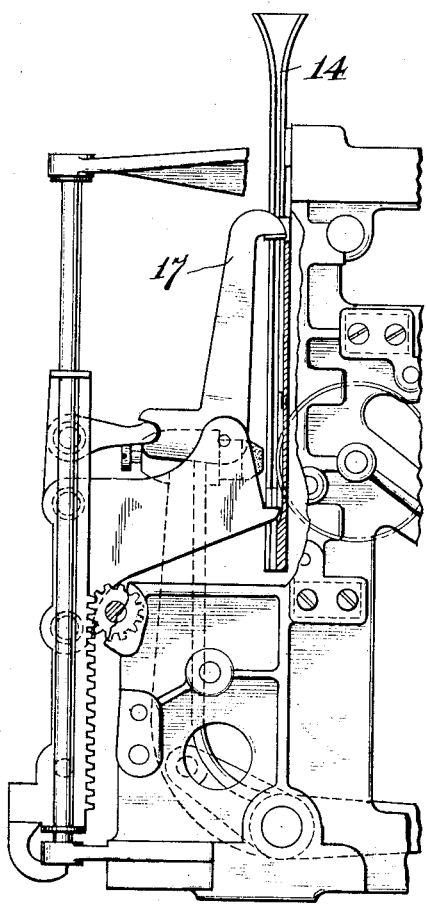
James W. Bryce, INVENTOR.
BY Kerr Page,
Cooper & Hayward
his ATTORNEYS J. W. BRYCE.
METHOD OF PUNCHING WORKMEN'S CARDS.
APPLICATION FILED AUG. 3, 1915.
1,207,491.
Patented Dec. 5, 1916.
4 SHEETS—SHEET 4.
Fig. 9,
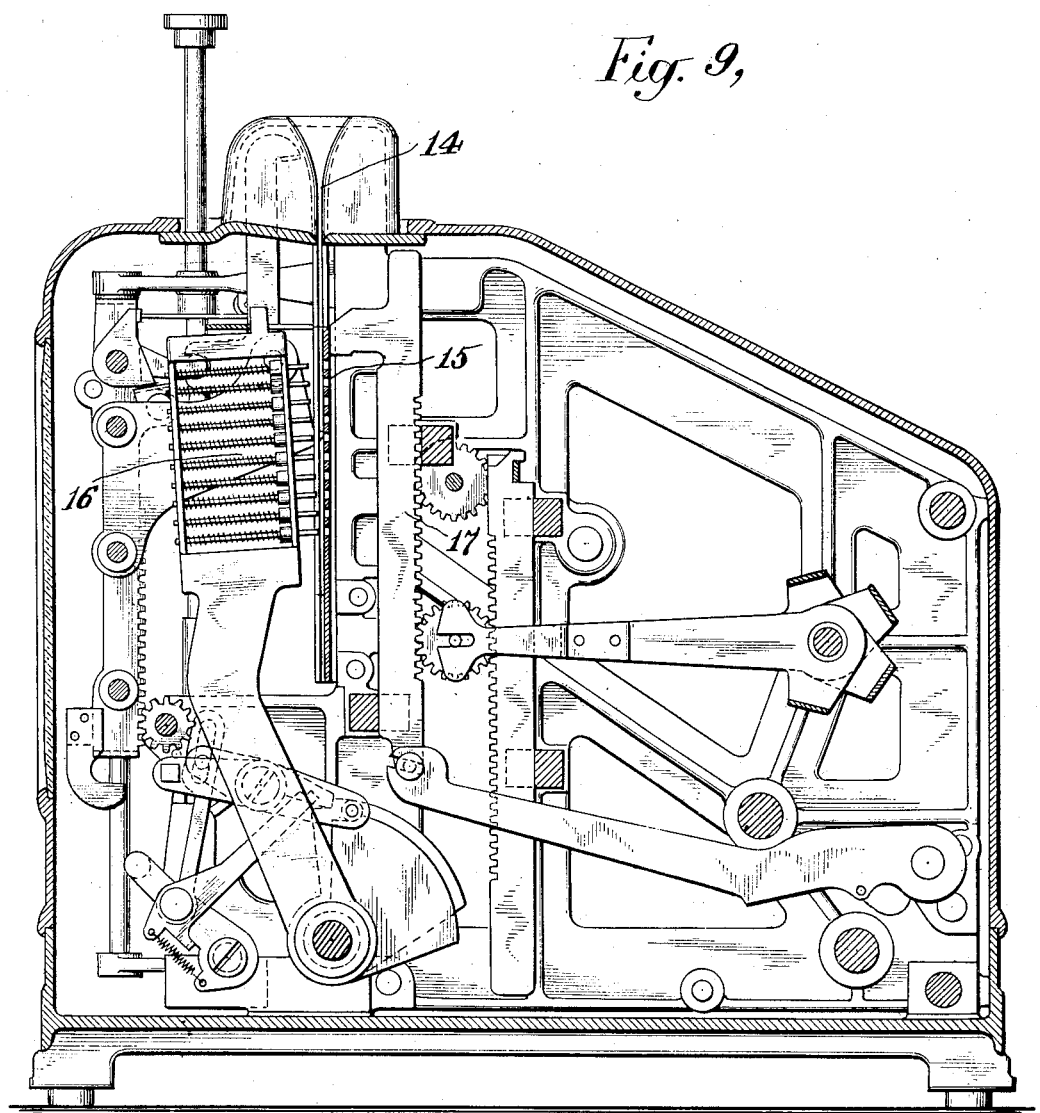

UNITED STATES PATENT OFFICE.

JAMES WARES BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

METHOD OF PUNCHING WORKMEN'S CARDS.

1,207,491.      Specification of Letters Patent.      Patented Dec. 5, 1916.

Application filed August 3, 1915. Serial No. 43,374.

*To all whom it may concern:*

Be it known that I, JAMES WARES BRYCE, a citizen of the United States, residing at Bloomfield, county of Essex, and State of New Jersey, have invented certain new and useful Improvements in Methods of Punching Workmen's Cards, of which the following is a full, clear, and exact description.

It has heretofore been customary in shops, factories, and the like to distribute to the workmen or mechanics, cards having more or less printed matter thereon which a workman at the commencement of a job, inserts into a time recording machine, and operates the latter to punch holes in the card, which indicate by their position therein the "in" time, or that at which the job was begun. On the completion of the work, the card is again inserted into another part of the machine which is properly operated to punch another series of holes therein whose position indicates the "out" time or that of the completion of the job. Usually, such machines are provided with a series of time type-wheels which print upon the card at given points, the "in" and the "out" times and such other data as the proper operation of the system may require. These cards are usually turned into the office where they are inserted by someone designated for that purpose, into a calculating machine which is provided with a bank of spring seated pins which are brought up against the card with sufficient pressure so that those pins only which lie immediately over punched holes in the card pass through the latter, and serve as stops for the moving parts of the calculating mechanism which sets time type wheels to print on the card the elapsed time between the periods corresponding to the two sets of punched holes, or other data which may be required. In some cases, the "in" and "out" and elapsed times are all punched or printed, as the case may be, by a single piece of mechanism operated by the workman, but it is more usual and satisfactory to intrust to the workman the printing and punching of the "in" and "out" times only, and to leave to the office force the calculation and printing of the elapsed time. Workmen and clerks, however, are proverbially negligent or careless in handling these cards. A workman for example, when inserting his card into the time printing and punching machine, will either not force it sufficiently far into the machine, or will withdraw it more or less from the machine before the punches have completed their work, so that the holes in the card, which by their position, indicate times, are not always in the exact position which they should be, and the pins of the calculating machine may not therefore register with the holes, but be arrested by uncut portions of the card in their vicinity. It is not a difficult matter to assure the proper lateral position of the holes, as this is determined by the width of the card chute into which the cards of a given size are introduced, and to which they may be accurately fitted. The difficulty, however, arises from failure to properly vertically adjust the card in the chute.

Various plans have been proposed and designed for avoiding the displacement of the punched holes in a workman's card, among which is that of withdrawing from the workman's control the inserted card, and after it has left his control, adjusting it by the machine itself to its proper position. This and other plans, while they greatly conduce to closer accuracy of punching, are still liable to error, and it is the purpose of this invention to carry out the general process of punching cards and calculating the elapsed time from the holes therein, by introducing into the process a step which largely obviates the possibility of error arising from the displacement of the holes.

According to my invention, I use rectangular cards of greater length than width and provide the time punching and printing machine into which they are first introduced with chutes or holders to receive the cards in a vertical position, that is to say, with their greater or longer dimension parallel with the line of insertion. I also provide for the calculating machine a chute or holder which receives a card in a position at right angles to that of the first machine, that is to say, with its longer dimension at right angles to the line of insertion.

When the card is punched on the "in" or "out" insertion, the error, if any, is in a vertical line as the width of the chute and that of the card prevent its lateral displacement. The same is true, also of the calculating machine so that the liability to error in the displacement of the holes is reduced onehalf by inserting the card into the second machine in a position at right angles to its position in the first machine.

In the accompanying drawings, I have illustrated the cards used in practising this process, and so much of the mechanism for printing and punching them and calculating the elapsed time from the punched holes as is necessary to a full understanding of the invention.

Figure 1 is a plan view of a card after it has been printed and punched on the "in" operation. Fig. 2 is the same card printed and punched on the "out" operation. Fig. 3 is the same card, after it has passed through the calculating machine, and had imprinted thereon, the elapsed time. Fig. 4 is a portion of a card showing a single hole punched on the "in" operation and slightly misplaced in position. Fig. 5 is the same card showing two punched holes resulting from the "in" and "out" operation, both of which are slightly misplaced vertically. Fig. 6 is the same card introduced at right angles to its former position into the calculating machine, and showing the position of pins therein relatively to the holes punched in the card. Fig. 7 shows the correct position of the punched hole with reference to a calculating pin. Fig. 8 is a portion of the time printing and punching machine illustrating the card chute, the greater dimension of which is vertical. Fig. 9 is a partly sectional view of the calculating machine showing the bank of pins, and Fig. 10 is another view of the same machine showing the card chute and means for retaining the card therein, the greater dimension of the chute being horizontal or at right angles to that of Fig. 7.

The cards 1, 1, 1 have appropriate numbers and spaces printed thereon so that when a card is inserted on the "in" operation into the machine, and the latter operated, it prints the "in" time in the space 2, the month and day of the month in space 3, and the department number or character in space 4. Similarly, when the card is introduced into its appropriate chute, at the completion of the job and the machine properly operated, "out" time is printed in space 5, the month and day of the month in space 6 and the department number in space 7. In addition to this printing, holes are punched in the card as indicated at 8, 8, which by their position, indicate the "in" and "out" times of the two operations. The mechanism for printing and punching the card in the first machine is sufficiently illustrated for purposes of this case in Fig. 8. The card is introduced lengthwise, into a chute 9. Then by the operation of the machine, the card drops to an abutment 10 or substantially so, and is withdrawn from the control of the operator and pulled or pushed down by an arm 11. This and other means which may be employed, adjust the card to substantially its correct position, whereupon by the operation of a suitable crank handle, appropriate punches 12 are forced through the card, the time type wheels 13 are set to indicate the time of the operation and the latter is printed on the card. The card, when sent to the office is then placed by some one of the force into the calculating machine shown in Fig. 9. This machine has a card chute 14 into which the card is inserted sidewise or horizontally in the position shown in Fig. 3, between a perforated plate 15 and a bank of spring actuated pins 16. By reference to Fig. 9, it will be seen that the card after entering the chute, is drawn or pushed down to approximately its proper position by a gripper 17, and when in position, by the operation of suitable driving mechanism, the bank of pins 16 are forced against the card, whereupon those pins which register with holes in the card will pass through the latter to serve as stops for the mechanism 17, which adjusts to position the time type-wheels, not fully illustrated, to print the elapsed time between the two periods corresponding to the "in" and "out" perforations in the card. It is not necessary to describe further in detail the mechanism for accomplishing these results. Suffice it to say, the card, after it issues from the calculating machine, is printed as appears in Fig. 3 with the elapsed time in spaces 18.

In Figs. 4, 5, and 6, the tendency to error in the punching of the cards is illustrated. For example, in Fig. 4, the card is shown in a vertical position, and the punch hole 8, indicated in full lines, is shown as slightly above its correct position, which is indicated by dotted line 19. In Fig. 5, the hole 8 is slightly below its correct position on the "out" operation, the other hole being that shown in Fig. 4. In Fig. 6, when the card is turned at right angles and introduced into the calculating machine, it will be seen that these errors or misplacements of the punched holes are in a horizontal and not a vertical direction, so that more or less latitude is left for the pins to enter the holes, whereas, if there had also been an error in the vertical placing of the card in the chute, the pins would not have passed through the proper holes in substantially the position indicated in Fig. 7.

As indicated above, it is immaterial whether the two operations of punching the card and of calculating the elapsed time from the punched holes are performed by a single unitary machine operated by the same power or crank shaft or whether these two operations are performed on different machines, as for the several operations the card must be inserted in different chutes and the liability of error will be equally present in either case.

It goes, of course, without saying that a reversal in the order of the position of the card would result in the elimination of liability to error to the same extent, that is to say, the card may be inserted in the time punching and printing machine sidewise and into the second machine lengthwise without change of results.

I claim:—

1. The process of punching workmen's cards to indicate by the position of the punched holes different periods of time, and of calculating from such punched holes the elapsed time between such periods, which consists in introducing into the time punching machine, and into the calculating machine respectively, the said cards lengthwise and sidewise, whereby the liability to misplacement of the perforations is limited to one direction so that the pins of the calculating machine will more nearly register with the punched holes.

2. The process of punching workmen's cards to indicate by the position of the punched holes different periods of time, and of calculating from such punched holes the elapsed time between such periods which consists in introducing into the vertically extended chute of the time punching machine the cards with their sides in contact with the sides of the chute, and introducing the same cards into the horizontally extended chute of the calculating machine with their ends in contact with the sides of said chute whereby the tendency to misplacement of the perforations is limited to one direction so that the pins of the calculating machine will more readily register with the punched holes.

In testimony whereof I hereunto affix my signature.

JAMES WARES BRYCE.